US010778652B2

(12) United States Patent
Martin et al.

(10) Patent No.: US 10,778,652 B2
(45) Date of Patent: Sep. 15, 2020

(54) SECURE COMPUTATIONAL WORKFLOWS

(71) Applicant: BAE Systems Information and Electronic Systems Integration Inc., Nashua, NH (US)

(72) Inventors: Patrick J. Martin, Falls Church, VA (US); Brent C. Baker, Vadnais Heights, MN (US); Collin T. Blakley, Vienna, VA (US); Gregory T. Eakman, Billerica, MA (US); Robert B. Ross, Fairfax, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 287 days.

(21) Appl. No.: 16/050,253

(22) Filed: Jul. 31, 2018

(65) Prior Publication Data
US 2020/0045021 A1 Feb. 6, 2020

(51) Int. Cl.
*H04L 29/06* (2006.01)
*H04L 9/30* (2006.01)

(52) U.S. Cl.
CPC ............ *H04L 63/0428* (2013.01); *H04L 9/30* (2013.01); *H04L 63/062* (2013.01)

(58) Field of Classification Search
None
See application file for complete search history.

(56) References Cited

U.S. PATENT DOCUMENTS

| | | | | |
|---|---|---|---|---|
| 9,419,951 | B1* | 8/2016 | Felsher | H04L 9/0825 |
| 2005/0204143 | A1* | 9/2005 | Ellington | G06F 21/31 |
| | | | | 713/182 |
| 2007/0150480 | A1* | 6/2007 | Hwang | G06Q 50/32 |
| 2009/0199298 | A1* | 8/2009 | Miliefsky | H04L 63/20 |
| | | | | 726/25 |
| 2012/0159642 | A1* | 6/2012 | Bradley | G06Q 20/1235 |
| | | | | 726/27 |
| 2014/0033324 | A1* | 1/2014 | Kiang | H04L 67/2861 |
| | | | | 726/27 |
| 2015/0271296 | A1* | 9/2015 | Borzycki | H04L 67/104 |
| | | | | 709/202 |
| 2015/0309921 | A1* | 10/2015 | Smith | G06F 21/00 |
| | | | | 717/131 |
| 2017/0262655 | A1* | 9/2017 | Runkis | H04L 9/3213 |
| 2017/0351875 | A1* | 12/2017 | Rotem | H04L 63/1441 |

\* cited by examiner

*Primary Examiner* — Maung T Lwin
(74) *Attorney, Agent, or Firm* — Finch & Maloney PLLC

(57) ABSTRACT

Techniques are disclosed for providing a secure computational platform that facilitates collaboration of assets from different asset providers without exposure of the assets to threats. The assets may be in the form of tools, models, simulations, and other computational assets, which can be used, for example, to perform trade studies. The secure computational platform provides for integration of the assets in a workflow, while protecting the assets during construction and execution of the workflow. In some instances, each asset in the workflow is executed in an IT infrastructure of the asset provider to which the asset belongs.

20 Claims, 10 Drawing Sheets

SECURE COMPUTATIONAL WORKFLOWS

STATEMENT OF GOVERNMENT INTEREST

This invention was made with United States Government assistance under Contract No. HQ0727-16-D-0002/0003 awarded by the US Air Force. The United States Government has certain rights in this invention.

FIELD OF THE DISCLOSURE

This disclosure relates generally to analysis and collaboration systems, and more particularly, to a secure collaboration platform for integrating assets from different asset providers.

BACKGROUND

Organizations face procurement decisions on a recurring basis. Procurement is one component of the broader concept of sourcing and acquisition. In the general sense, procurement is the process of finding, agreeing to terms, and acquiring goods, services, or other works from one or more sources. Corporations and public bodies often define processes intended to promote fair and open competition for their business, while minimizing risk such as fraud and collusion. In the context of military acquisitions, Analysis of Alternatives (AoA) is a requirement that ensures at least three feasible alternatives are analyzed prior to making any major acquisition decision. An objective is to move away from employing a single acquisition source to the exploration of multiple alternatives so agencies have a basis for arriving at acquisition decisions in a rational and defensible manner considering risk and uncertainty. For a given decision, the AoA attempts to arrive at the best value for a set of proposals received from the private sector or other sources.

A proper AoA tends to require a workflow between assets being considered for an acquisition. Proper evaluation of an asset in a workflow requires exposing information regarding the asset or the asset otherwise interoperating with other assets in the workflow. The assets are provided by sources, such as contractors, academics, and other vendors, bidding on the acquisition. However, the assets being considered for an acquisition are commonly provided by multiple sources (asset providers) who are unwilling to share such data at the risk of exposing the asset to loss or other threats. Moreover, existing decision support tools do not provide the necessary protection of assets. As a result, decision methodologies tend to be informal and one-of-a-kind, and organizations faced with having to make acquisition decisions commonly resort to informal, ad-hoc evaluation methods, often using spreadsheets to evaluate the assets. To this end, safeguarding of assets and their information is paramount to a proper AoA and the evaluation of the assets in a workflow.

Figure 1:
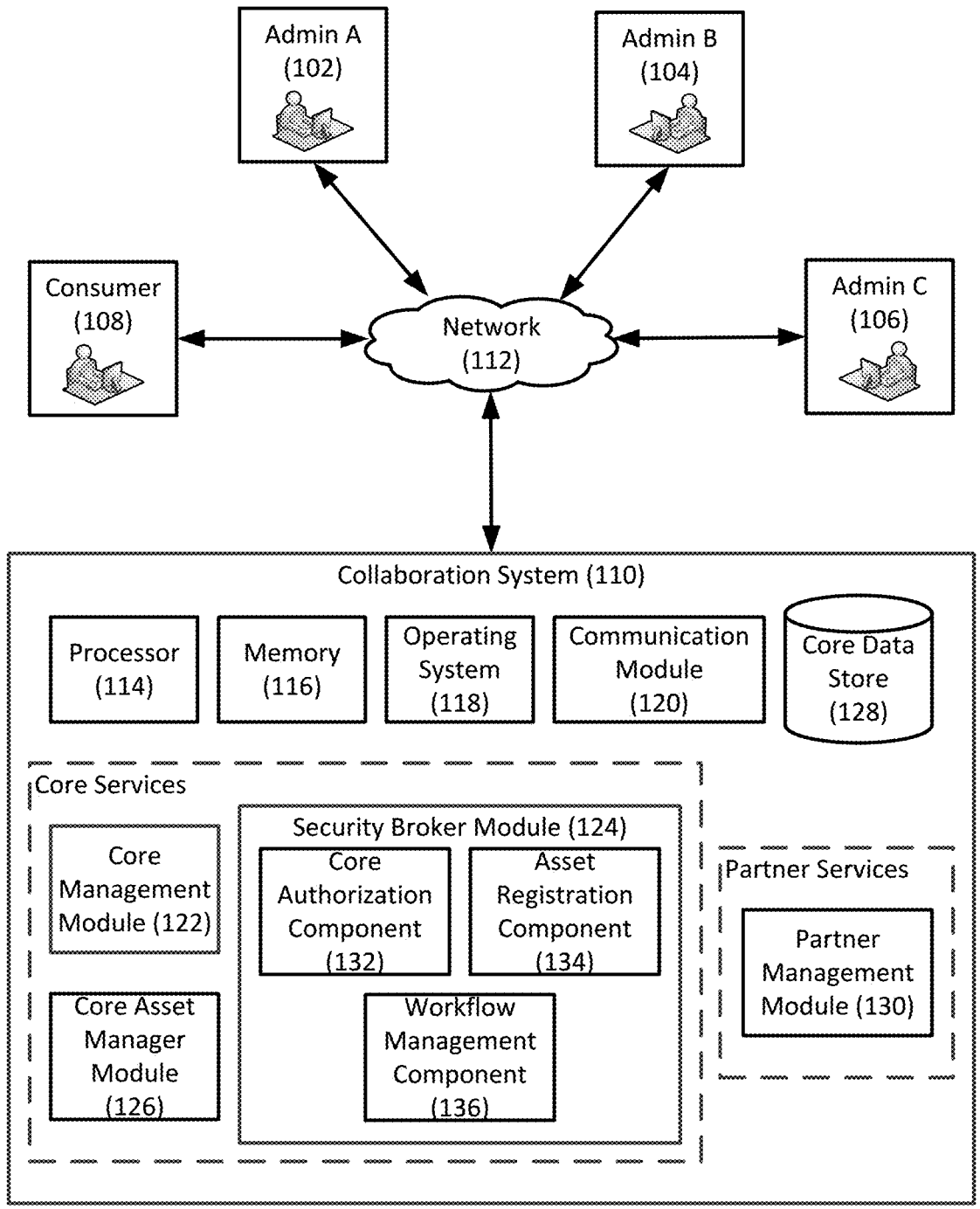
FIG. 1 is a block diagram schematically illustrating an example networked computer system that can be used to create a secure computational platform, in accordance with an embodiment of the present disclosure.

Although the following Detailed Description will proceed with reference being made to illustrative embodiments, many alternatives, modifications, and variations thereof will be apparent to those in light of the present disclosure.

DETAILED DESCRIPTION

Many efficiencies and benefits can be derived from being able to integrate assets from different asset providers into workflows. For example, such workflows assist in conducting trade studies by enhancing the efficiency and speed of the asset evaluation process, which results in identifying a desired, balanced technical solution among a set of proposed, viable solutions. However, as previously noted, a provider of an asset may be hesitant to offer the asset for evaluation for fear of exposing the asset to threats, such as cyber threats, reverse engineering, data leakage, or any other undesired exposure of the asset.

To this end, techniques are disclosed herein for providing a secure computational platform that facilitates collaboration of assets from different asset providers without exposure of the assets to such threats. The assets may be in the form of tools, models, simulations, and other computational assets, which can be used to perform trade studies. Such assets can be integrated together to form a computational workflow (sometimes referred to herein more simply as a "workflow"). The asset providers may be organizations, such as government organizations and agencies, academic organizations, product companies, service companies, vendor companies, industry organizations, and other partner organizations wanting to be affiliated with and participate in the secure computational platform. The secure computational platform provides for integration of such assets in a workflow, while protecting the assets during construction and execution of the workflow.

In more detail, and in accordance with an embodiment of the present disclosure, a collaboration system provides a collection of services that can be utilized by an organization, such as a procuring organization, to create a secure computational platform. The services can also be utilized by partner organizations affiliated with (e.g., included in) the secure computational platform to securely share assets and provision workflows. For example, to become affiliated with a secure computational platform, a partner organization can use a service to submit a registration request to the collaboration system to be affiliated with the secure computational platform. The registration request can include information identifying the partner organization and at least one administrator of the partner organization. If the registration is approved, the collaboration system maintains a record of the registered administrator (e.g., registered administrator identifier), and grants the registered administrator privileges to access or otherwise interact with the secure computational platform. Note that in instances where multiple administrators are identified, the collaboration system may grant the administrators the same or different privileges. The registered partner organization is then tasked with managing and controlling access of the secure computational platform by other users (e.g., users other than the administrators granted privileges to access or interact with the secure computational platform) in the organization. For example, in the case of another user in the registered partner organization wanting to interact with the secure computational platform, the interaction is via the registered administrator identifier and the privileges associated with the registered administrator identifier. That is, the registered administrator identifier acts as a proxy for the other users in the registered partner organization. In any case, access between the registered partner organization and the secure computational platform is via the registered administrator identifier and the privileges associated with the registered administrator identifier. As such, the collaboration system manages the registration of partner organizations, and the granting of privileges to the registered partner organizations, at the partner or organization level. Note that a partner organization can register multiple administrators.

A registered partner organization is able to register one or more assets with the collaboration system. For example, the registered partner organization can use a service provided by the collaboration system to register an asset. By registering an asset, the registered partner organization becomes or is otherwise considered to be an asset provider within the secure computational platform. Registering an asset causes the asset to be published within the secure computational platform, making the registered asset visible within the secure computational platform. Notwithstanding the visibility of the registered asset with in the secure computational platform, a registered asset never "physically" leaves the control of an asset provider (e.g., the asset owner) in that the asset provider does not physically or otherwise actually provide the asset to the collaboration system when registering the asset. That is, the asset being registered is not actually provided outside the asset provider's infrastructure. Rather, only information necessary to make a decision as to whether (or not) to include the registered asset in a workflow, and information necessary to allow for communicating with the asset in the case the asset is included in a workflow, is provided by the asset provider and published within the secure computational platform. Such information may include information identifying the registered asset (e.g., a Uniform Resource Identifier (URI) or other suitable identifier associated with the asset), information regarding the defined methods of interfacing with the registered asset (e.g., the application programming interface (API) specifying the inputs to and/or outputs of the registered asset), and a description of the asset. It will be appreciated that, although the asset itself is not provided outside the asset provider's infrastructure, such information including the information regarding the API in particular, is published within the secure computational platform to provide for effective communication with the registered asset. For example, in the case of a registered asset being executable code, computer data or other computational asset, for instance, the asset does not leave information technology (IT) infrastructure of the asset provider (the registered partner organization that is registering the asset), but the API information is published to allow for communication with an executing instance of the asset. Here, infrastructure refers to the underlying framework or features of an organization. IT infrastructure refers to the composite hardware, software, network resources, and services required for the existence, operation and management of an enterprise IT environment. In the context of a registered partner organization, the IT infrastructure refers to the composite hardware, software, network resources, and services needed for the existence, operation and management of the registered partner organization's enterprise IT environment. Additionally, a registered asset does not "physically" leave the control of an asset provider even when the registered asset is included in a workflow. Further, when such registered asset is executed as part of the workflow, the asset is executed on the infrastructure, such as the IT infrastructure, belonging to and controlled by the asset provider.

Thus, the secure computational platform provides a secure, scalable computational environment that facilitates sharing of assets from different asset providers, while protecting the assets from threats outside the control of the respective asset owner. Such an environment encourages organizations to provide and share their assets for evaluation. For instance, in certain embodiments, the secure computational platform allows for the integration of different asset provider assets into workflows performed as part of AoA and/or trade studies. This allows for an efficient, fast, and more complete analysis of assets. These and other advantages and alternative embodiments will be apparent in light of this disclosure.

An example system and use case for provisioning a secure computational work flow according to an embodiment includes a security broker module along with first and second supervisors and is as follows. The example use case can be, for instance, in the context of two government contractors—Company A and Company B—which are competitors of one another but need to ensure compatibility of their respective systems/processes being sourced to the government or otherwise understand how the two systems/processes will operate together. The secure computational workflow allows for the interconnection of such systems/processes (computational assets) of Companies A and B to perform an AoA that supports trade space exploration. Although this problem can be solved on local, enterprise systems, it is quite challenging when applied to collections of heterogeneous, cloud-hosted assets that are owned by multiple organizations. To do so requires a combination of dynamics, computing allocation, access management, and secure communications.

To this end, the security broker module is programmed or otherwise configured to receive a request to provision a workflow, the workflow including an integration of a first asset owned by Company A and a second asset owned by Company B. Either Company A or B can make the request, or a third party (e.g., government official). The first and second asset providers (Companies A and B) are associated with first and second IT infrastructures (e.g., cloud-based assets accessible via the Internet or other network), respectively. In response to the request, a first supervisor is programmed or otherwise configured to launch and execute a first asset service for the first asset, and a second supervisor is programmed or otherwise configured to launch and execute a second asset service for the second asset. Each of the first and second asset services includes an asset application and a corresponding asset handler. Note that the first asset service is launched and executed in the first IT infrastructure (Company A's network), and the second asset service is launched and executed in the second IT infrastructure (Company B's network). As will be further appreciated, the first and second asset services effectively act as proxies and allow for interconnection of the computational assets of Companies A and B, so compatibility or interoperability or trade space can be safely evaluated, for instance. Once all asset proxies are connected in the workflow over encrypted communication lines, the computations execute the analysis and the final results are delivered to the user invoking the AoA application. For instance, execution of the first asset service causes the asset handler of the first asset service to directly communicate an output of its corresponding asset application to the asset handler of the second asset service. Numerous use cases will be apparent.

System Architecture

Turning now to the figures, FIG. 1 is a block diagram schematically illustrating an example networked computer system that can be used to create a secure computational platform 100, in accordance with an embodiment of the present disclosure. More specifically, the system illustrated in FIG. 1 can be understood as enabling an administrator A 102, an administrator B 104, an administrator C 106 (collectively referred to as administrators 102, 104, 106), and a consumer 108 to leverage the services of a collaboration system 110. For instance, administrators 102, 104, 106 can use the services of collaboration system 110 to register their respective partner organizations for inclusion in secure computational platform 100. Once registered, administrators 102, 104, 106 can use the services of collaboration system 110 to register respective assets with collaboration system 110. Similarly, consumer 108 can use the services of collaboration system 110 to integrate published assets into workflows. In such embodiments, administrators 102, 104, 106 and consumer 108 communicate with collaboration system 110 via a network 112. Network 112 can also be used to access supplementary services and resources, some of which may (or may not) be integrated into and provided by collaboration system 110 in some cases. Thus, other embodiments may have fewer or more networks, services, and/or resources depending on the granularity of implementation. It will therefore be appreciated that the embodiments disclosed herein are not intended to be limited to the provision or exclusion of any particular services and/or resources.

Network 112 may be a local area network (such as a home-based or office network), a wide area network (such as the Internet), a peer-to-peer network (such as a Bluetooth connection), or a combination of such networks, whether public, private, or both. In certain embodiments, at least a portion of the functionality associated with network 112 is provided by a cellular data network, thereby making it easier for users of mobile computing devices to leverage the services of collaboration system 110. In general, communications amongst the various entities and resources described herein may occur via wired or wireless connections, such as may be provided by Wi-Fi or mobile data networks.

As illustrated in FIG. 1, administrators 102, 104, 106 and consumer 108 each have access to a device that facilitates interaction with other users and/or components of collaboration system 110 or are otherwise described herein. For example, in certain embodiments, administrators 102, 104, 106 and consumer 108 each have access to one or more of a variety of suitable computing devices, including devices such as desktop computers, laptop computers, workstations, enterprise class server computers, handheld computers, tablet computers, cellular telephones, smartphones, and set-top boxes. Other devices may be used in other embodiments. The devices used by administrators 102, 104, 106 and consumer 108 optionally include a wired and/or wireless communication adapter that enables communication via network 112. The devices also optionally include input/output components such as one or more of a tactile keyboard, a display, a touch sensitive display, a microphone, a camera, and location services. Such input/output components allow administrators 102, 104, 106 and consumer 108 to not only control operation of their own respective devices, but also to control certain operational aspects of collaboration system 110.

For example, in one example use case and embodiment, administrators 102, 104, 106 represent administrative personnel in charge of registering their respective partner organizations for affiliation with secure computational platform 100. Consumer 108 represents an administrator of a partner organization, such as an acquisitions administrator at government agency or an administrative user at another partner organization, who is tasked with creating and executing a workflow from published assets. For instance, administrator A 102 may be an administrator at partner organization A, administrator B 104 may be an administrator at partner organization B, and administrator C 106 may be an administrator at partner organization C. For example, for a U.S. government contract, several parties may be teaming together for certain phases or portions of the program. Partner organization A may be BAE Systems; partner organization B may be Raytheon; and partner organization C may be Lockheed Martin. These partners may be related to each other such as contractor team members, prime contractors, subcontractors, joint ventures, suppliers, or vendors.

Administrator A 102 leverages services provided by collaboration system 110 to register organization A to be affiliated with secure computational platform 100. Likewise, administrator B 104 leverages services provided by collaboration system 110 to register organization B to be affiliated with secure computational platform 100, and administrator C 106 leverages services provided by collaboration system 110 to register organization C to be affiliated with secure computational platform 100. When a partner organization is registered, the registered partner organization's IT infrastructure is implicitly registered in that the IT infrastructure becomes a part of the infrastructure of the secure computational platform. For instance, the implicitly registered IT infrastructure can be the registered partner organization's IT infrastructure that will subsequently be used to execute the registered partner organization's published asset as part of a workflow. Note, however, that the registered partner organization maintains full control of its registered IT infrastructure that is implicitly made part of the secure computational platform 100. That is, the registered partner organization does not relinquish control of the implicitly registered IT infrastructure or otherwise allow unintended entities to control the implicitly registered IT infrastructure. Being able to execute its assets on its own IT infrastructure allows the registered partner organization (e.g., asset owner) to protect the asset from threats. Continuing the example, a result of organization A registering with collaboration system 110 is that organization A's IT infrastructure implicitly becomes part of the secure computational platform 100 infrastructure. Similarly, a result of organization B and organization C registering with collaboration system 110 is that organization B's IT infrastructure and organization C's IT infrastructure, respectively, implicitly become part of the secure computational platform 100 infrastructure. In this manner, secure computational platform 100 becomes a distributed platform composed of platform segments (e.g., IT infrastructures) associated with respective registered partner organizations, where each registered partner organization controls its corresponding platform segment in secure computational platform 100.

Once the organization A, organization B, and organization C partner organizations are registered, administrator A 102 can leverage services provided by collaboration system 110 to register an organization A asset, administrator B 104 can leverage services provided by collaboration system 110 to register an organization B asset, and administrator C 106 can leverage services provided by collaboration system 110 to register an organization C asset. When registering an asset, the organization registering the asset (asset provider) can specify the terms of using the asset. The terms of use specify the conditions for using the asset, for example, as part of a workflow. Examples of such terms include a constraint on the number of calls that can be made to the asset, a constraint on the number of concurrent runs (instances) of the asset, and start and end times of access to the asset, and valid IP addresses from which the asset will accept communications, for example, while executing as part of a workflow. Continuing the example, administrator A 102 can specify the terms of use of the registered organization A asset, administrator B 104 can specify the terms of use of the registered organization B asset, and administrator C 106 can specify the terms of use of the registered organization C asset. Collaboration system 110 can publish the registered organization A asset, organization B asset, and organization C asset within secure computational platform 100.

Consumer 108 can interact with collaboration system 110 and become aware of the published organization A asset, organization B asset, and organization C asset. Consumer 108 can leverage services provided by collaboration system 110 to provision a workflow comprised of the organization A asset, organization B asset, and organization C asset. In response, collaboration system 110 initiates creation of the requested workflow. In certain embodiments, collaboration system 110 causes the respective launching of the organization A asset, organization B asset, and organization C asset. In general, launching of an asset involves allocation of resources sufficient to execute the asset, and creation of a cryptographic key for use in communicating with the asset. Note that each asset is launched in the respective IT infrastructure of the asset provider. For instance, the organization A asset is launched in organization A's IT infrastructure, the organization B asset is launched in organization B's IT infrastructure, and the organization C asset is launched in organization C's IT infrastructure. Once an asset is launched, the launched asset transmits or otherwise provides its cryptographic key to collaboration system 110. Collaboration system 110 then transmits to each launched asset in the workflow the cryptographic key needed for the launched asset to communicate with the next (following) launched asset in the workflow. Continuing the example, the launched organization A asset receives the cryptographic key associated with the launched organization B asset, the launched organization B asset receives the cryptographic key associated with the launched organization C asset, and the launched organization C asset, as the last asset in the workflow, receives a cryptographic key associated with a "dummy" asset to use in communicating the results of its execution. Collaboration system 110 then instructs the workflow to execute. When executing as part of the workflow, each launched asset in the workflow communicates directly with the next launched asset in the workflow. Moreover, since each launched asset may be executing in a different domain (e.g., different IT infrastructure), the communication between the launched assets is encrypted using the cryptographic key of the receiving launched asset. During workflow execution, collaboration system 110 can monitor the executing assets in the workflow to check for adherence to the terms of use specified for the assets. In an embodiment, collaboration system 110 can terminate communication between launched assets upon determining a violation of the specified terms of use. Provisioning (e.g., creating, executing, etc.) of workflows is further described below.

Note that secure computation platform 100 illustrated in FIG. 1 is for illustration only, and it will be appreciated in light of this disclosure that secure computational platform 100 can include a different number of partner organizations, registered partner organizations, and/or asset providers. It will also be appreciated in light of this disclosure that there may be a different number of administrators than that illustrated in FIG. 1, and that multiple administrators can be associated with a partner organization. Numerous other configurations and variations will be apparent in light of this disclosure.

Referring still to the example embodiment illustrated in FIG. 1, collaboration system 110 can be configured to facilitate the creation of a secure computational platform, such as secure computational platform 100, for instance. Collaboration system 110 is also configured to facilitate the registration of assets, creation of workflows, and execution of workflows within the secure computational platform. To this end, in one embodiment, collaboration system 110 includes one or more software modules configured to implement certain of the functionalities disclosed herein, and optionally further includes hardware configured to enable such implementation. This hardware may include, but is not limited to, a processor 114, a memory 116, an operating system 118, and a communication module 120. Processor 114 can be any suitable processor, and may include one or more coprocessors or controllers, such as an audio processor or a graphics processing unit, to assist in processing operations of collaboration system 110. Memory 116 can be implemented using any suitable type of digital storage, such as one or more of a disk drive, a redundant array of independent disks (RAID), random access memory (RAM), or any suitable combination of the foregoing. Operating system 118 may comprise any suitable operating system, such as UNIX®, LINUX®, MICROSOFT® WINDOWS® (Microsoft Crop., Redmond, Wash.), GOOGLE® ANDROID™ (Google Inc., Mountain View, Calif.), APPLE® iOS (Apple Inc., Cupertino, Calif.), or APPLE® OS X® (Apple Inc., Cupertino, Calif.). As will be appreciated in light of this disclosure, the techniques provided herein can be implemented without regard to the particular operating system provided in conjunction with collaboration system 110, and therefore may also be implemented using any suitable existing or subsequently developed platform. Communication module 120 can be any appropriate network chip or chipset which allows for wired or wireless communication via network 112 to one or more of the other components described herein. Communication module 120 can also be configured to provide intra-device communications via a bus or an interconnect.

Referring again to the example embodiment illustrated in FIG. 1, collaboration system 110 further includes a core management module 122, a security broker module 124, a core asset manager module 126, and a partner management module 130. In such embodiments, core management module 122, security broker module 124, and core asset management module 126 may be considered as providing the secure computational platform core services, and partner management module 130 may be considered as providing the secure computational platform partner services. In general, the core services allow for the setup and manage a secure computational platform, and the partner services, interacting or otherwise working in conjunction with the core services, allow for the participation of partner organizations in the secure computational platform. In an implementation, each partner organization is provisioned a set of the partner services.

Figure 2:
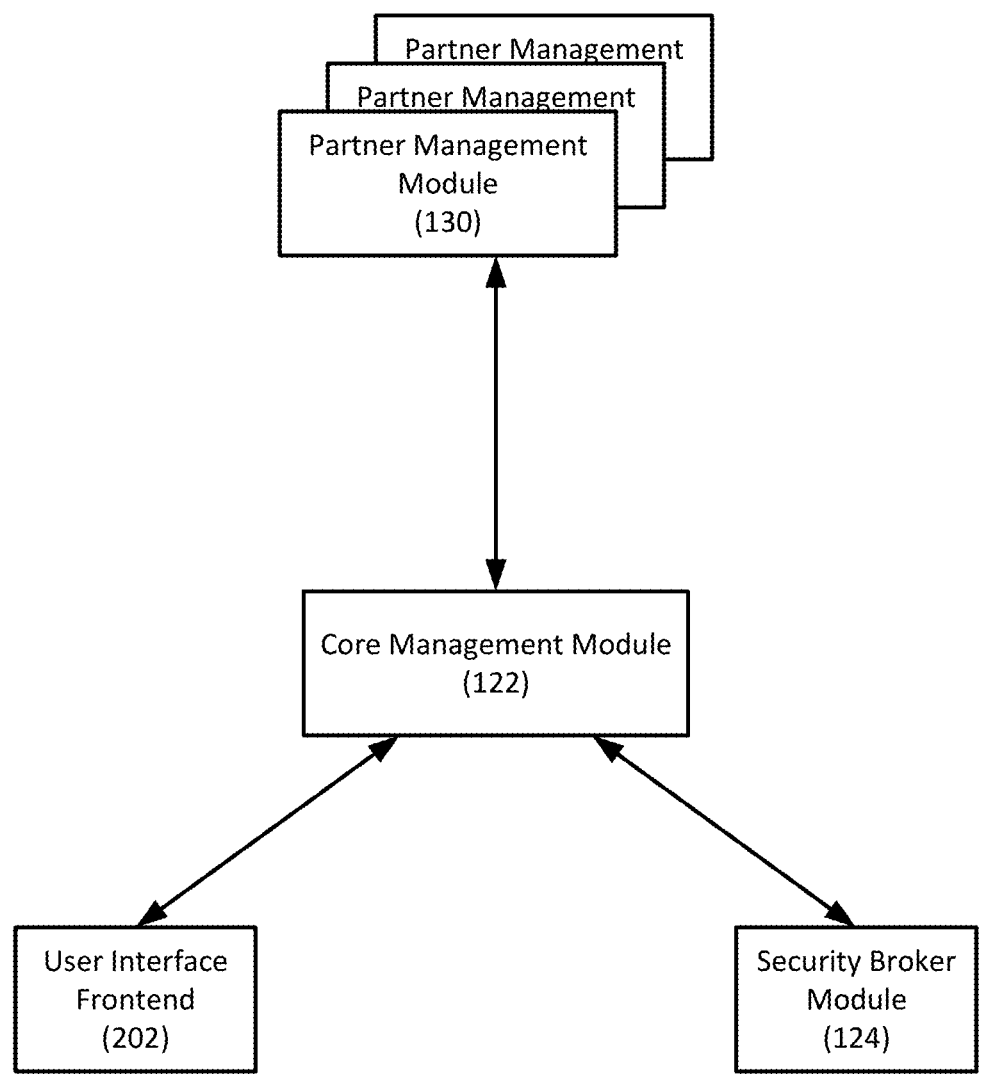
FIG. 2 is a block diagram schematically illustrating interactions of a core management module with other services of the secure computational platform, in accordance with an embodiment of the present disclosure.

Core management module 122 is generally configured to provide the services for supervisory administrative control and management of the secure computational platform. FIG. 2 is a block diagram schematically illustrating interactions of core management module 122 with other services of the secure computational platform. In an embodiment, core management module 122 coordinates all user and organization management with security broker module 124. In an implementation, core management module 122 provides a user interface frontend 202 that allows an administrative user (e.g., administrator) of the secure computational platform to establish and manage the partner organizations. User interface frontend 202 may be a client application that is configured to provide a user interface that is capable of displaying information to, and receiving information from the secure computational platform administrator or other appropriate user of collaboration system 110. For example, in one implementation, core management module 122 includes a web server, and user interface frontend 202 is a web client or frontend. In an example use case and embodiment, when a partner organization, via partner management module 130, submits a request to register with the secure computational platform, the registration request is provided to the administrator of the secure computational platform through security broker module 124. In this case, if the secure computational platform administrator allows access (e.g., approves the requested registration of the partner organization), security broker module 124 grants the privileges to the registered partner organization, and stores data regarding the granted privileges in a core data store 128.

Core management module 122 can provide other user interfaces. For example, core management module 122 can provide user interfaces for managing registered partner organizations, communicating with registered partner organizations, and evicting registered partner organizations, to name a few examples. The various user interfaces provided or otherwise generated by core management module 122 can be rendered using hardware components associated with an end user's computing device. Thus, for example, the secure computational platform administrator can use input/output components associated with his/her computing device to leverage services provided by core management module 122 and, in particular, to display and interact with the user interfaces generated core management module 122. Examples of input/output components that can be used in this regard include a display, a keyboard, a pointing device, and a touch sensitive surface. Such components can be peripheral to an end user's computing device, or can be integrated into such device. In certain embodiments, collaboration system 110 is implemented in a client-server arrangement wherein at least some functionality, such as the functionality provided by core management module 122, is provided to the secure computational platform administrator using an applet (for example, a JavaScript applet) or other downloadable module. Such a remotely-provisioned module can be provided in real-time in response to a request from the secure computational platform administrator for access to functionality associated with a particular user interface.

Figure 3:
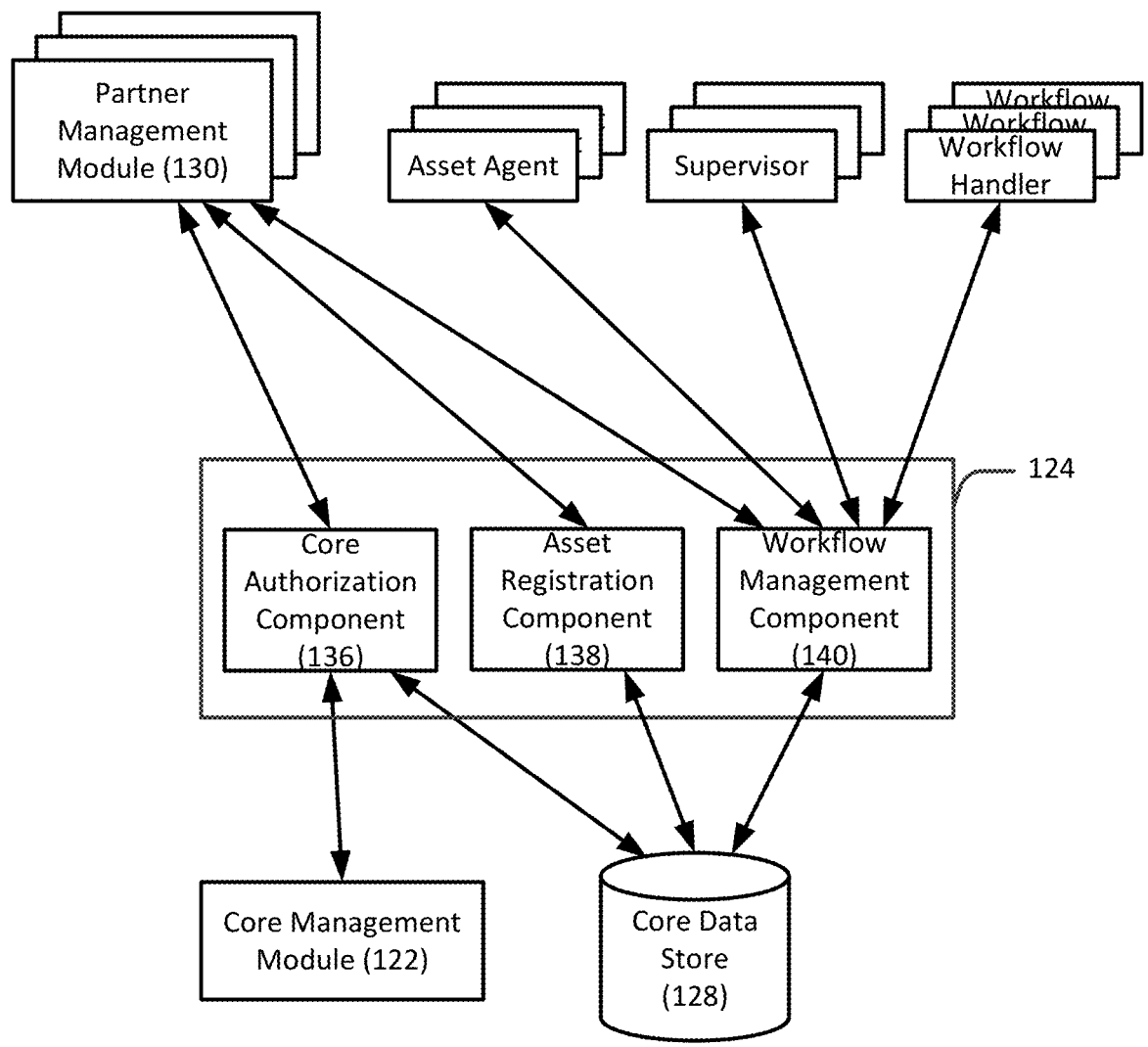
FIG. 3 is a block diagram schematically illustrating interactions of a security broker module with other services of the secure computational platform, in accordance with an embodiment of the present disclosure.

Referring again to the example embodiment illustrated in FIG. 1, security broker module 124 includes a core authorization component 132, an asset registration component 134, and a workflow management component 136. Security broker module 124 is generally configured to provide the services for brokering the user interactions with the secure computational platform. In such embodiments, security broker module 124 provides a central point for the secure computational platform administrators to manage members of the secure computational platform, including the member's respective privileges (e.g., permissions, rights, etc.) to the secure computational platform infrastructure. FIG. 3 is a block diagram schematically illustrating interactions of security broker module 124 with other services of the secure computational platform. In an embodiment, core authorization component 132 is configured to manage the registration of partner organizations. In an example use case and embodiment, core authorization component 132 receives a request to register a partner organization from partner management module 130, and routes the received request to core management module 122. If the registration request is approved, for example, by the secure computational platform administrator, core authorization component 132 receives a registration approval notification from core management module 122. In this case, core authorization component 132 grants the privileges to the registered partner organization, stores data regarding the approved registration and the granted privileges in core data store 128, and notifies partner management module 130 of the approved registration of the partner organization and the granted privileges. Conversely, in the case the registration request is not approved, core authorization component 132 notifies partner management module 130 of the non-approval of the registration. In another example use case, core authorization component 132 notifies partner management module 130 and/or core management module 122 of a removal (e.g., deregistration) of a registered partner organization from the secure computational platform. For instance, the secure computational platform administrator may remove a registered partner organization from the secure computational platform. In this case, core authorization component 132 notifies partner management module 130 associated with the removed partner organization of the removal from the secure computational platform. In general, core authorization component 132 communicates with partner management module 130 and/or core management module 122 regarding partner organization registration-related issues.

In an embodiment, asset registration component 134 is configured to process asset registration and deregistration requests. In an example use case and embodiment, asset registration component 134 receives a request to register an asset from partner management module 130. The asset registration request may be accompanied by one or more terms of use of the asset. For instance, an authorized user in a partner organization may use partner management module 130 to request registration of the asset. In response, asset registration component 134 determines whether the asset can be registered. In an implementation, asset registration component 134 can make this determination using data regarding the user stored in core data store 128. If the user is authorized to register the asset, asset registration component 134 records an indication of the registration of the asset in core data store 128. Asset registration component 134 also stores meta data associated with the registered asset, such as an identifier associated with the registered asset, description of the asset, and other appropriate data regarding the asset, including data regarding the terms of use of the asset, in core data store 128. Asset registration component 134 notifies partner management module 130 of the registration of the asset. Conversely, in the case the asset is not registered, asset registration component 134 notifies partner management module 130 of the non-registration of the asset. Similarly, asset registration component 134 can receive a request to deregister a registered asset from partner management module 130. In such case, asset registration component 134 removes the record of the registration of the asset in core data store 128. In any case, asset registration component 134 provides partner management module 130 notification of the registration (or deregistration) of the asset.

In an embodiment, workflow management component 136 is configured to process the provisioning of a workflow. More specifically, workflow management component 136 performs the signaling between the various services of collaboration system 110 and the secure computational platform to provision a workflow. In an example use case and embodiment, workflow management component 136 receives a request to provision a workflow from partner management module 130. For instance, an authorized user in a partner organization may use partner management module 130 to request provisioning of the workflow. In response, workflow management component 136 checks to determine whether the user requesting the workflow is authorized (e.g., has privileges) to provision the workflow. In an implementation, workflow management component 136 can make this determination using data regarding the user stored in core data store 128. In some embodiments, workflow management component 136 checks to determine whether the user requesting the workflow has available sufficient resources to provision and execute the workflow. Examples of resources include processing time available to the user or the user's organization (e.g., user or organization may be allotted a budgeted an amount of time to process and/or execute workflows), and resources or budget to pay for the cost of execution of the assets by the asset providers (note that an asset is executed on the IT infrastructure of the asset provider), to name two examples. Workflow management component 136 can make the determination as to whether the user has sufficient resources from the data regarding the user stored in core data store 128. If the user is authorized to provision the workflow, and the user has sufficient resources available to provision the workflow in some instances, workflow management component 136 initiates provisioning of the workflow, including the assets included in the workflow. In an implementation, provisioning of the workflow can include workflow management component 136 associating a workflow handler with the workflow, instructing respective asset agents of the assets to provision the respective asset, receiving cryptographic keys from respective supervisor processes of the assets, storing the cryptographic keys and related data in core data store 128, providing each supervisor process an appropriate cryptographic key, and instructing the appropriate supervisor process to execute. Workflow management component 136 notifies partner management module 130 of the provisioning of the requested workflow. Conversely, in the case the user is not authorized to provision the workflow, or the user has available insufficient resources to provision the workflow in some instances, workflow management component 136 notifies partner management module 130 of the failure to provision the requested workflow. Asset agents, supervisor processes, and provisioning of workflows are further described below.

Referring again to the example embodiment illustrated in FIG. 1, core asset manager 126 is generally configured to provide the services for accessing data stored in core data store 128. In an embodiment, core asset manager 126 provides read-only access to data regarding the assets stored in core data store 128. For example, in one implementation, core asset manager 126 provides an interface that can be used to request information regarding an asset stored in core data store 128. The interface is also capable of displaying the requested information from core data store 128. For example, a workflow creator (or owner) can leverage this service to obtain information regarding assets while constructing a workflow.

Core data store 128 is configured to maintain data (information) regarding the users, assets, and other support services of or otherwise associated with the secure computational platform. In some embodiments, core data store 128 can be implemented on a back-end server that is remote from collaboration system 110 and operable to communicate with collaboration system 110 over a network, such as the Internet or an intranet. Core data store 128 can include any suitable digital storage device configured to store digitally encoded data.

Figure 4:
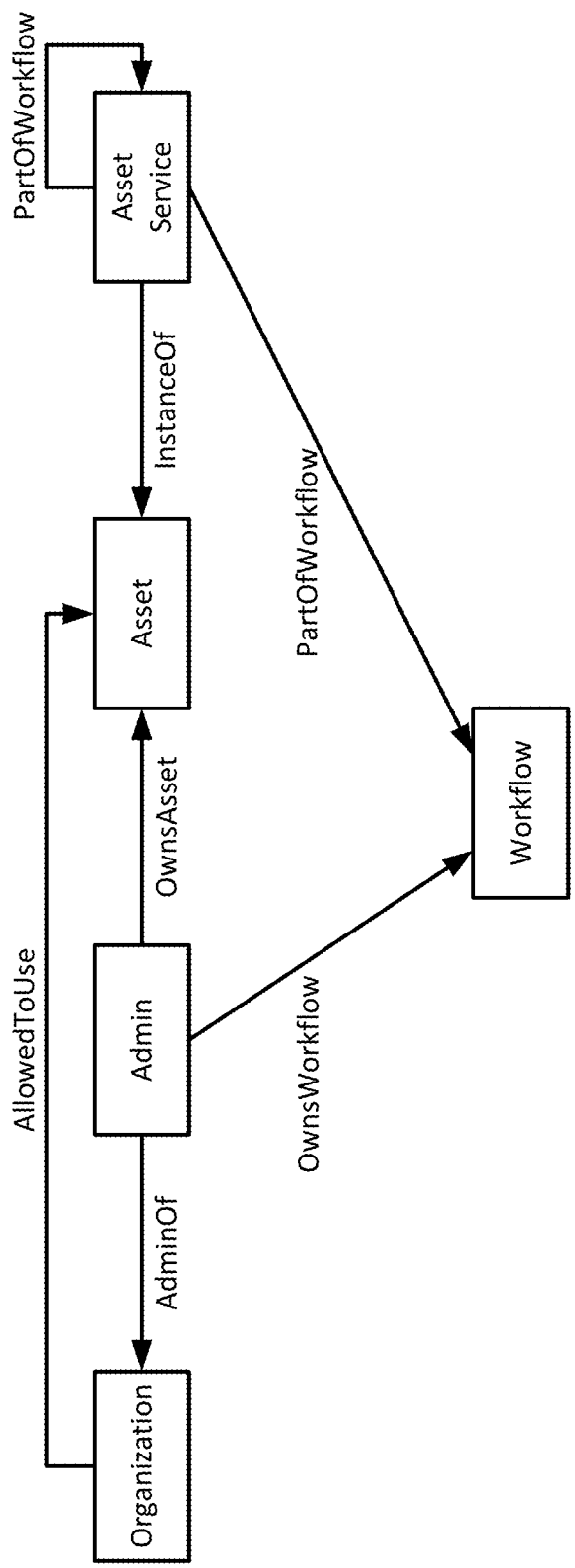
FIG. 4 illustrates an example graph database schema for a core data store, in accordance with an embodiment of the present disclosure.

In some embodiments, core data store 128 is implemented as a graph database. FIG. 4 illustrates an example graph database schema for core data store 128. In such embodiments, the graph database schema allows for properly capturing the complex relationships among the secure computational platform entities. Table 1 below summarizes the entities and associated properties according to one embodiment of the present disclosure:

TABLE 1

| Entity | Description | Associated Property |
| --- | --- | --- |
| Organization | Represents a partner organization affiliated with the secure computational platform. | |
| Admin | Represents a partner organization administrator. Note that there may be one or more Admins associated with a partner organization. | Email address<br>Password<br>Access Flag<br>Phone number (optional) |
| Asset | Represents a computational asset that may be shared within the secure computational platform as part of a workflow. | Asset agent URI<br>Public key<br>Version number<br>Description |
| Asset Service | Represents an instantiation of an asset within the secure computational platform. | Asset service URI<br>Public key<br>Budget constraint<br>Call limit constraint<br>Time window constraint start<br>Time window constraint end |
| Workflow | Represents a secure workflow that is allowed to execute in the secure computational platform. | Workflow handler URI<br>Public key |

Organization identifies a particular partner organization that is in or otherwise affiliated with the secure computational platform. Administrator represents an administrator of the organization. Each administrator entity includes the attributes email address, password, access flag, and phone number. The email address specifies a unique email address associated with the administrator. In some cases, access to collaboration system 110 and/or the secure computational platform may require credentials such as a username and password, or may require compliance with any other suitable security mechanism. The password is used to prove the identity or access approval of the administrator to gain access to collaboration system 110 and/or the secure computational platform. The access flag specifies the access privileges of the administrator. The phone number is optional, and specifies a number where the administrator can be reached. Asset represents a particular computational asset that may be shared within the secure computational platform as part of a workflow. Each asset entity includes the attributes asset agent URI, public key, version number, and description. The asset agent URI uniquely identifies the asset agent associated with the asset. The URI can be used to identify and communicate with the particular asset agent. The public key is a cryptographic key that can be used to encrypt messages (e.g., communications) intended for the asset agent associated with the asset. Such encrypted messages can be deciphered only by using a private key that is known to the particular asset agent. The version number specifies a unique version of the asset. The description generally describes the asset. Asset service represents a particular instantiation of an asset within the secure computational platform. Each asset service entity includes the attributes asset service URI, public key, budget constraint, call limit constraint, time window constraint start, and time window constraint end. The asset service URI uniquely identifies the asset service. The URI can be used to identify and communicate with the particular asset service. The public key is a cryptographic key that can be used to encrypt messages (e.g., communications) intended for the asset service. Such encrypted messages can be deciphered only by using a private key that is known to the particular asset service. Budget constraint specifies a constraint on the amount of funds that can be spent on compute time within the secure computational platform. For instance, the specified constraint can be the constraint on the compute time for executing the asset service on the asset provider's IT infrastructure. Call limit constraint specifies a limit on the number of call that can be made to the asset service. Time window constraint start and time window constraint end respectively specifies a start time and an end time for the asset service (e.g., a start and end time for executing the asset). Workflow represents a workflow that is allowed to execute in the secure computational platform. Each workflow entity includes the attributes workflow handler URI and public key. In some embodiments, a workflow handler is associated with each workflow. In such embodiments, the workflow handler is included at the end of the workflow, and provides an operational hook into the particular workflow. The workflow handler functions as a "dummy" asset handler at the end of the workflow that receives the output of the workflow (the output from the last asset service in the workflow). The workflow handler URI uniquely identifies the workflow handler. The URI can be used to identify and communicate with the particular workflow handler. The public key is a cryptographic key that can be used to encrypt messages (e.g., communications) intended for the workflow handler. Such encrypted messages can be deciphered only by using a private key that is known to the particular workflow handler.

Table 2 below summarizes the types of relationships that are possible between the entities according to one embodiment of the present disclosure:

TABLE 2

| Relationship | Description |
| --- | --- |
| AllowedToUse | Sets access privileges for organization to access assets. |
| AdminOf | Establishes the Admin users that are the admins of an organization. Specifically, the Admin users are the admins of the organization's secure computational platform segment. |
| OwnsAsset | Indicates which Admin owns a deployed asset. |
| OwnsWorkflow | Indicates which Admin owns a valid workflow. |
| InstanceOf | Indicates which asset a particular asset service instantiates. |
| PartOfWorkflow | Indicates the asset services associated with a particular workflow. Property: ContractID—a unique identifier for the workflow. |

The relationship AllowedToUse between an organization and an asset indicates the access privileges for the organization as to the particular asset. An organization may have access privileges to use none, one, or more assets. Also, an asset can be useable by one or more organizations. The relationship AdminOf between an administrator and an organization indicates the administrative users of the particular organization that are registered with the secure computational platform. Such registered administrative users are the administrators of the particular organization's secure computational platform segment. There may be one or more administrative users of an organization. The relationship OwnsAsset between an administrator and an asset indicates whether the administrator is the owner of the particular asset. An administrator may own none, one, or more assets. The relationship OwnsWorkflow between an administrator and a workflow indicates whether the administrator is the owner of the particular workflow. An administrator may own none, one, or more workflows. The relationship InstanceOf between an asset service and an asset indicates whether the asset service is an instantiation of the particular asset. There may be none, one, or more instantiations of an asset. The relationship PartOfWorkflow between an asset service and a workflow indicates whether the asset service is a part of the particular workflow. The relationship PartOfWorkflow includes an attribute ContractID that specifies a unique identifier of the workflow. An asset service may be a part of none or one workflow.

Figure 5:
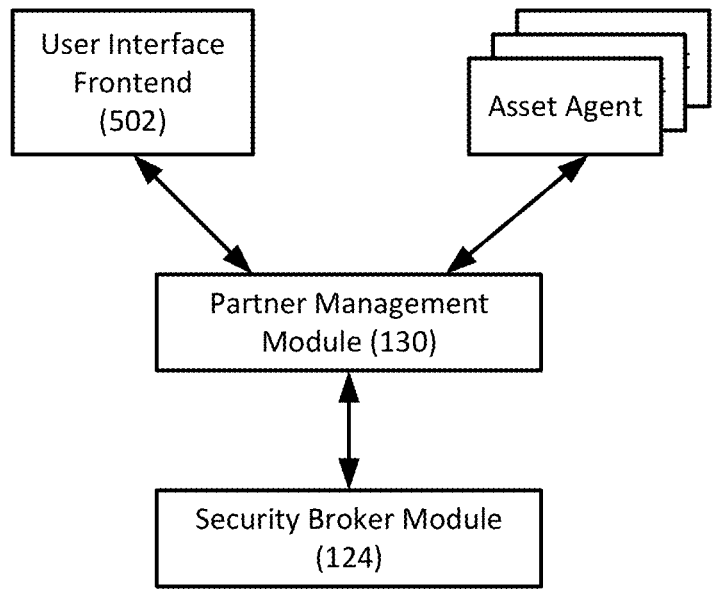
FIG. 5 is a block diagram schematically illustrating interactions of a partner management module with other services of the secure computational platform, in accordance with an embodiment of the present disclosure.

Referring again to the example embodiment illustrated in FIG. 1, partner management module 130 is configured to provide the services for partner organization users to use or otherwise interact with the secure computational platform. FIG. 5 is a block diagram schematically illustrating interactions of partner management module 130 with other services of the secure computational platform. In an implementation, partner management module 130 provides a user interface frontend 502 that allows users in a partner organization, such as administrators of the partner organization, to interact with the secure computational platform. User interface frontend 502 may be a client application that is configured to provide a user interface that is capable of displaying information to, and receiving information from the partner organization administrator or other appropriate user in the partner organization. In an example use case and embodiment, partner management module 130 receives a request to register the partner organization from user interface frontend 502, and provides the registration request to security broker module 124. For instance, a partner organization administrator can use user interface frontend 502 to request registration of the partner organization with the secure computational platform. If the registration request is approved, partner management module 130 receives such notification and the granted privileges from security broker module 124, and provides the partner organization administrator notification of the approved registration and the granted privileges, for instance, via user interface frontend 502. Conversely, in the case the registration request is not approved, partner management module 130 receives such notification from security broker module 124, and provides the partner organization administrator notification of the non-approval of the registration. In such embodiments, the registered partner organization administrators control their local user base (e.g., the users in the registered partner organization). Such local users may be composed of asset owners and trade study or workflow owners. In an implementation, partner management module 130 maintains the data regarding such local users and any relationships associated with the local users in a local data store, which may be similar to core data store 128, but with local scope.

In another example use case and embodiment, partner management module 130 receives a request to register a partner organization asset from user interface frontend 502, and provides the registration request to security broker module 124. For instance, an authorized user in the partner organization can use user interface frontend 502 to request registration of the asset with the secure computational platform. Note that in certain embodiments disclosed herein, such request from the authorized user in the partner organization is transmitted or otherwise provided to security broker module 124 utilizing the registration of, and privileges granted to, a registered administrator of the partner organization. If the asset is registered, partner management module 130 receives notification of the registration of the asset from security broker module 122, and provides the authorized user of the partner organization notification of the asset registration, for instance, via user interface frontend 502. Conversely, in the case the asset registration request is not approved, partner management module 130 receives such notification from security broker module 124, and provides the authorized user of the partner organization notification of the non-registration of the asset.

Partner management module 103 is also configured to provide the services for management and use of registered assets in the secure computational platform. In an example use case and embodiment, when a registered partner organization registers an asset, partner management module 103 generates an asset agent for the registered asset. In such embodiments, the asset agent is launched and maintained within the platform segment associated with the partner organization registering the asset. This allows the partner organization registering the asset to maintain control of and protect the registered asset from threats. In an implementation, the asset agent encapsulates the registered asset, and manages the provisioning of the encapsulated registered asset when included in and executed as part of a workflow. The asset agent performs the pre-processing to enable the asset to be executable. That is, the asset agent pre-processes the asset to get the asset into a state that is usable by the other components and services of the secure computational platform. In an embodiment, an asset is implemented as a Docker image. In other embodiments, an asset is implemented as a Rocket image. In a more general sense, an asset can be implemented as an executable application.

Figure 6:
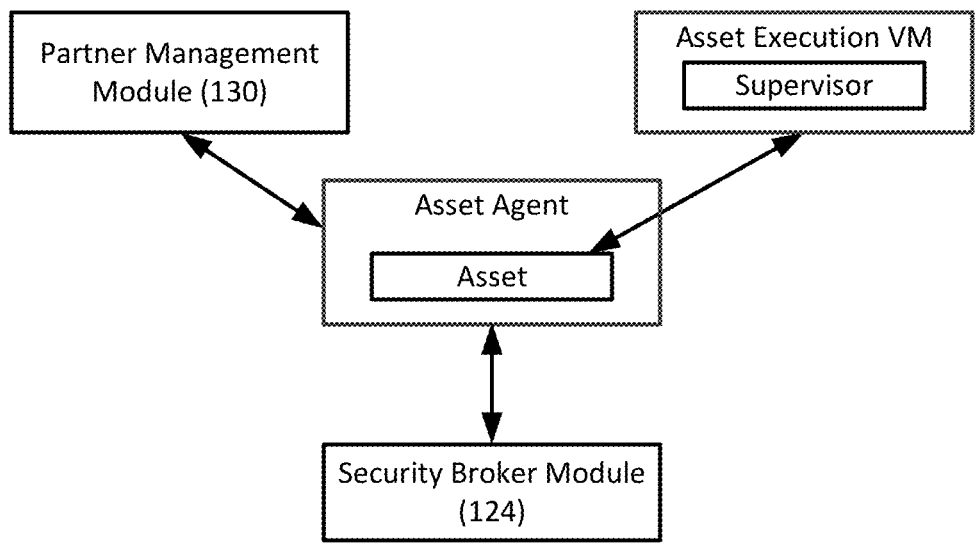
FIG. 6 is a block diagram schematically illustrating interactions of an asset agent with other services of the secure computational platform, in accordance with an embodiment of the present disclosure.

FIG. 6 is a block diagram schematically illustrating interactions of an asset agent with other services of the secure computational platform. In an example use case and embodiment, security broker module 124 registers an asset, which may be a Docker image in some instances. In response, partner management module 130 generates an asset agent for the registered asset, and executes the asset agent in a virtual machine (VM). In such embodiments, the asset agent stores the asset in the ephemeral storage of the asset agent's operating VM. When the asset is executed as part of a workflow, the asset agent requests an appropriate amount of computing resources from partner management module 130. A successful launch of the resources (e.g., allocation of the requested amount of computing resources) results in a live asset execution VM with a supervisor process. The supervisor process indicates to the asset agent that the requested computing resources are available, and retrieve the asset associated with the asset agent. For instance, the supervisor process can pull or otherwise obtain the asset form the ephemeral storage of the asset agent's operating VM. Note that the live asset execution VM is launched and maintained within the platform segment associated with the partner organization registering the asset.

Figure 7:
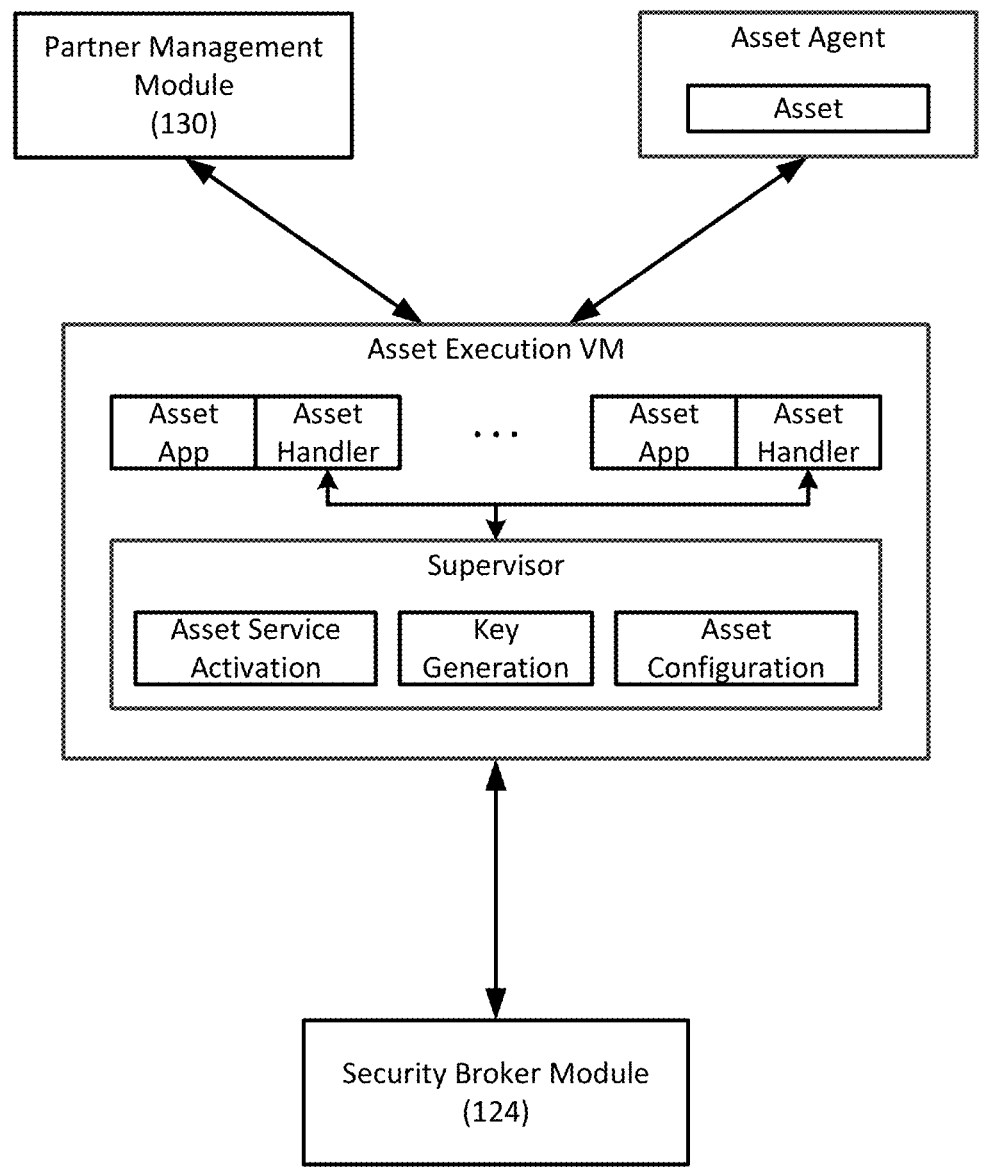
FIG. 7 is a block diagram schematically illustrating interactions of an asset execution virtual machine (VM) with other services of the secure computational platform, in accordance with an embodiment of the present disclosure.

FIG. 7 is a block diagram schematically illustrating interactions of an asset execution VM with other services of the secure computational platform. An asset execution VM is generated for an asset in a provisioned workflow. As such, the asset execution VM can be considered a support component of the workflow. As described previously, partner management module 130 can generate a live asset execution VM that includes a supervisor process. In an embodiment, the supervisor process functions include asset configuration, cryptographic key generation, and asset service activation. In such embodiments, the supervisor process indicates to the appropriate asset agent that computing resources for executing the asset are available, and obtains the asset from the asset agent. The supervisor process then generates an asset handler for the asset. In an implementation, the supervisor process generates an asset handler from a specification file that specifies the interface calls of the asset. In operation, the asset handler handles all communication to and from (input/output) the corresponding asset. The supervisor process configures and launches an appropriate number of asset services in the asset execution VM of the supervisor process. The number of asset services launched is based on the workflow's specifications. An asset service is an instantiation of an asset, and includes an asset application and a corresponding asset handler. The asset application is a live, executing asset, which conducts all communication through the corresponding asset handler. In the case of an asset being a Docker image, the asset application is a Docker image container. As an example, suppose a workflow specifies a sequence of Asset A, Asset B, Asset C, and Asset A. In this case, a supervisor process for Asset A configures and launches two (2) asset services using Asset A, a supervisor process for Asset B configures and launches one (1) asset service for Asset B, and a supervisor process for Asset C configures and launches one (1) asset service for Asset C. Note that a supervisor process can configure and launch one, two, or more asset services for a particular asset, and the number of asset services configured and launched for an asset is based on the requirements of the workflow. The supervisor process then generates a cryptographic key, such as a public key/private key pair, for each asset service. Once the asset services are launched and ready for execution, the supervisor process notifies security broker module 124, and provides security broker module 124 the cryptographic key (e.g., public key) generated for the asset service. In the case where the supervisor process launches multiple asset services, the supervisor process provides security broker module 124 the respective cryptographic keys generated for the launched asset services. The supervisor process then receives from security broker module 124 the cryptographic key for the next (following) asset in the workflow. The supervisor process provides the asset handler the cryptographic key for the next asset in the workflow, and activates execution of the asset service.

Figure 8:
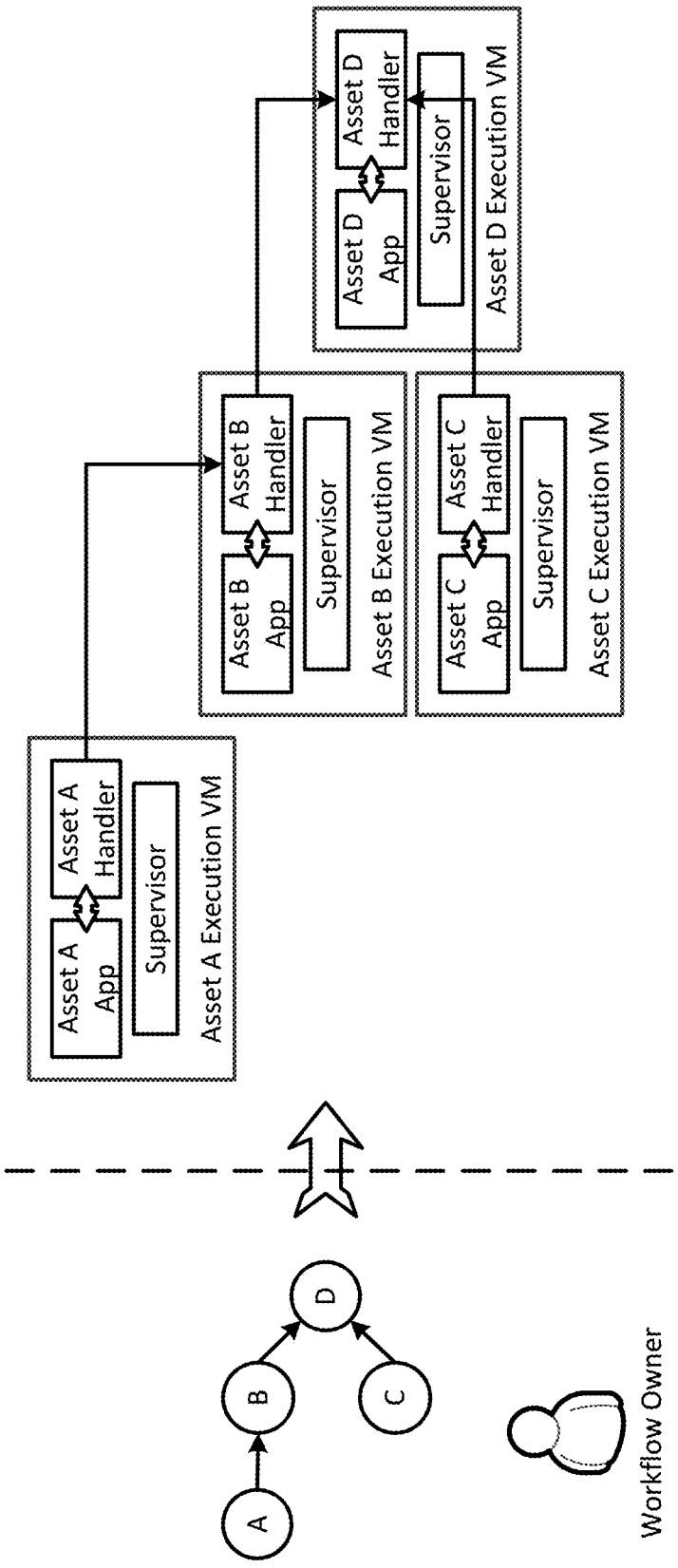
FIG. 8 is a block diagram schematically illustrating an example conceptual workflow and corresponding provisioned workflow, in accordance with an embodiment of the present disclosure.

In some embodiments, a workflow may be an application, and in some cases a dynamic application, developed and deployed by a workflow owner. In such embodiments, the workflow can integrate multiple distinct assets to support a trade study. FIG. 8 is a block diagram schematically illustrating an example conceptual workflow and corresponding provisioned workflow, in accordance with an embodiment of the present disclosure. As illustrated, a workflow owner may create a conceptual workflow composed of Asset A, Asset B, Asset C, and Asset D. Specifically, the conceptual workflow specifies that the output of Asset A is input to Asset B, and the respective outputs of Asset B and Asset C are input to Asset D. When provisioned as a workflow within a secure computational platform as variously described herein, the corresponding provisioned workflow comprises respective asset execution VMs for each distinct asset in the conceptual workflow. For instance, the provisioned workflow comprises an asset execution VM for Asset A, an asset execution VM for Asset B, an asset execution VM for Asset C, and an asset execution VM for Asset D. Each asset execution VM includes a supervisor process and a particular asset service. Specifically, the asset execution VM for Asset A includes a supervisor process and an asset service for Asset A (instance of an Asset A application and instance of an asset handler for Asset A), the asset execution VM for Asset B includes a supervisor process and an asset service for Asset B (instance of an Asset B application and instance of an asset handler for Asset B), the asset execution VM for Asset C includes a supervisor process and an asset service for Asset C (instance of an Asset C application and instance of an asset handler for Asset C), and the asset execution VM for Asset D includes a supervisor process and an asset service for Asset D (instance of an Asset D application and instance of an asset handler for Asset D). When executing, the asset applications only communicate with their corresponding (paired) asset handlers, and the asset handlers communicate with one another as appropriate. For instance, in the provisioned workflow, the asset handler for Asset A communicates the output of the asset application for Asset A to the asset handler for Asset B. The asset handler for Asset B communicates the output of the asset application for Asset B to the asset handler for Asset D, and the asset handler for Asset C communicates the output of the asset application for Asset C to the asset handler for Asset D. Although not shown in FIG. 1, the asset handler for Asset D communicates the output of asset application for Asset D to a workflow handler for the provisioned workflow. In this manner, an asset handler for an asset application communicates directly with the asset handler for the next asset application in the workflow. In certain of the embodiments described herein, the communication between the asset handlers is encrypted. In some embodiments, the communication between an asset application and its corresponding asset handler is encrypted. Such encrypted communication between asset handlers and/or between asset applications and corresponding asset handlers also provide security and protection of assets from threats.

The embodiments described herein can be implemented in various forms of hardware, software, firmware, or special purpose processors. For example, in one embodiment, a non-transitory computer readable medium has instructions encoded thereon that, when executed by one or more processors, cause aspects of secure computational platform 100 described herein to be implemented. The instructions can be encoded using any suitable programming language, such as C, C++, object-oriented C, Java, JavaScript, Visual Basic-.NET, BASIC, Scala, or alternatively, using custom or proprietary instruction sets. Such instructions can be provided in the form of one or more computer software applications or applets that are tangibly embodied on a memory device, and that can be executed by a computer having any suitable architecture. In one embodiment, the system can be hosted on a given website and implemented, for example, using JavaScript or another suitable browser-based technology.

The functionalities disclosed herein can optionally be incorporated into a variety of different software applications and systems, including trade study applications, collaborative applications, workflow applications, AoA applications, engineered resilient systems, acquisition systems, and simulation and modeling systems, to name a few examples. The functionalities disclosed herein can additionally or alternatively leverage services provided by separate software applications and systems. For example, in one embodiment, the functionalities disclosed herein can be implemented in a cloud environment, such as Microsoft® Azure®, AWS®, Google Cloud™, or any suitable cloud environment. Additionally or alternatively, the functionalities disclosed herein can be implemented using an IaaS framework. The computer software applications disclosed herein may include a number of different modules, sub-modules, or other components of distinct functionality, and can provide information to, or receive information from, still other components and services. These modules can be used, for example, to communicate with input/output devices such as a display screen, a touch sensitive surface, a digital camera, or any other suitable input/output device. Other components and functionality not reflected in the illustrations will be apparent in light of this disclosure, and it will be appreciated that the present disclosure is not intended to be limited to any particular hardware or software configuration. Thus, in other embodiments, the components illustrated in FIG. 1 may include additional, fewer, or alternative subcomponents.

The aforementioned non-transitory computer readable medium may be any suitable medium for storing digital information, such as a hard drive, RAM, Read-Only Memory (ROM), Electrically Erasable Programmable Read-Only Memory (EEPROM), Compact Disc Read-Only Memory (CD-ROM), or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media, or any suitable combination of the foregoing. In alternative embodiments, the computers and modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used in this regard, and that the present disclosure is not intended to be limited to any particular system architecture.

Methodology

Figure 9:
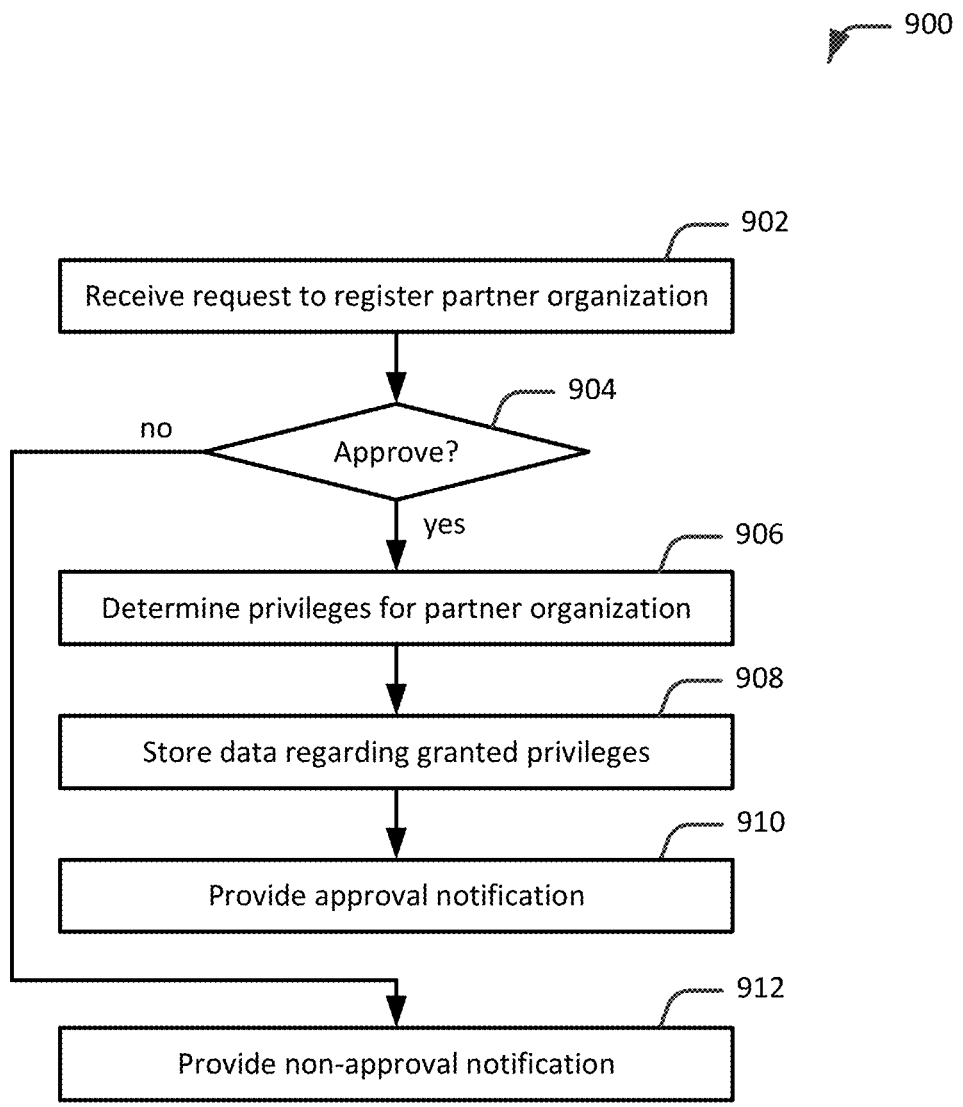
FIG. 9 is a flow diagram illustrating an example process to register a partner organization, in accordance with an embodiment of the present disclosure.
Figure 10:
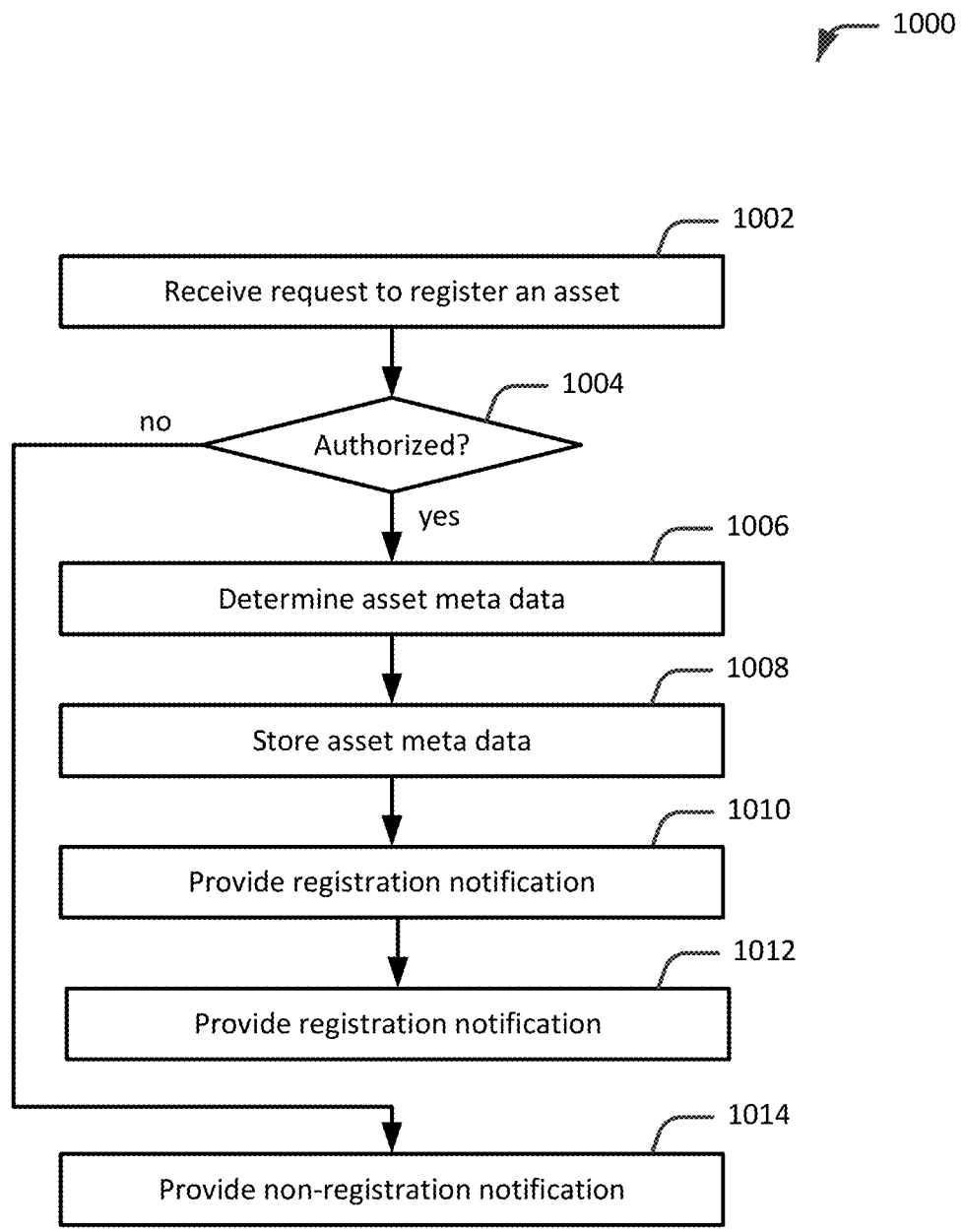
FIG. 10 is a flow diagram illustrating an example process to register an asset, in accordance with an embodiment of the present disclosure.
Figure 11:
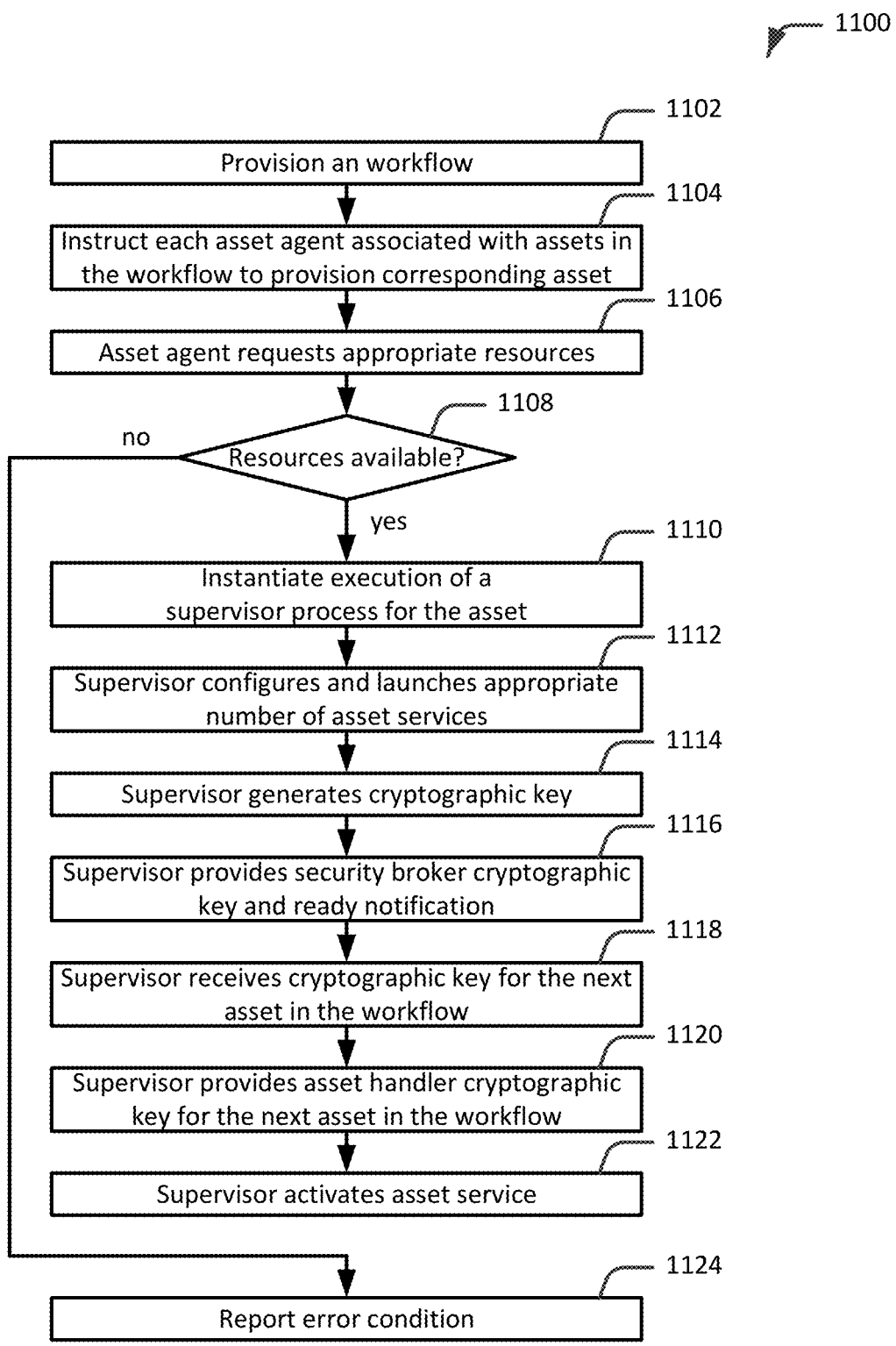
FIG. 11 is a flow diagram illustrating an example process to provision a workflow, in accordance with an embodiment of the present disclosure.

FIG. 9 is a flow diagram illustrating an example process 900 to register a partner organization, in accordance with an embodiment of the present disclosure. FIG. 10 is a flow diagram illustrating an example process 1000 to register an asset, in accordance with an embodiment of the present disclosure. FIG. 11 is a flow diagram illustrating an example process 1100 to provision a workflow, in accordance with an embodiment of the present disclosure. The operations, functions, or actions illustrated in example processes 900, 1000, and 1100 may in some embodiments be performed by various components of collaboration system 110 of FIG. 1. The operations, functions, or actions described in the respective blocks of example processes 900, 1000, and 1100 may also be stored as computer-executable instructions in a computer-readable medium, such as memory 116 of collaboration system 110.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

With reference to example process 900 of FIG. 9, at block 902, core management module 122 receives a request to register a partner organization to be affiliated with a secure computational platform. At decision block 904, security broker module 124 checks to determine whether to approve the registration request. If security broker module 124 determines to not approve the registration request, then, at block 912, core management module 122 provides the requesting partner organization a non-approval notification.

Otherwise, if, at decision block 904, security broker module 124 determines to approve the registration request, then, at block 906, security broker module 124 determines the privileges to grant the requesting partner organization. At block 908, security broker module 124 stores the data regarding the registration of the partner organization and the granted privileges in core data store 128. At block 910, core management module 122 provides the requesting partner organization an approval (registration) notification.

With reference to example process 1000 of FIG. 10, at block 1002, security broker module 124 receives a request from a registered partner organization to register an asset with a secure computational platform. At decision block 1004, security broker module 124 checks to determine whether the requesting registered partner organization is authorized to register the asset. If security broker module 124 determines that the requesting registered partner organization is not authorized to register the asset, then, at block 1014, security broker module 124 provides the requesting registered partner organization a non-registration notification.

Otherwise, if, at decision block 1004, security broker module 124 determines that the requesting registered partner organization is authorized to register the asset, then, at block 1006, security broker module 124 determines the asset meta data. The asset meta data can include information regarding the asset and the terms of use of the asset. At block 1008, security broker module 124 stores the asset meta data in core data store 128. At block 1010, security broker module 124 published the registered asset within the secure computational platform. At block 1012, security broker module 124 provides the requesting registered partner organization a registration notification.

With reference to example process 1100 of FIG. 11, at block 1102, security broker module 124 determines to provision a workflow in a secure computational platform. For instance, security broker module 124 may determine to provision a workflow in response to a request from a workflow owner. At block 1104, security broker module 124 instructs each asset agent associated with the assets in the workflow to provision its corresponding asset. As will be appreciated in light of this disclosure, blocks 1106 to 1124 of process 110 are performed for each asset in the workflow.

At block 1106, the asset agent requests appropriate computing resources for executing the asset. At decision block 1108, a check is made to determine whether resources are available for executing the asset. If sufficient resources are not available, then, at block 1124, an error condition indicating non-availability of resources is reported.

Otherwise, if it is determined that sufficient resources are available at decision block 1108, then, at block 1110, execution of a supervisor process for the asset is instantiated. According to certain embodiments, the supervisor process execution is instantiated in a VM. At block 1112, the supervisor process configures and launches an appropriate number of asset services. An asset service is an instantiation of an asset application and a corresponding asset handler. The appropriate number of asset services to configure and launch is determined from the workflow. At block 1114, the supervisor process generates a cryptographic key for the asset service. At block 1116, the supervisor process provides the generated cryptographic key to security broker module 124. At block 1118, the supervisor process receives from security broker module 124 a cryptographic key for the next asset in the workflow. At block 1120, the supervisor process provides the asset handler component of the asset service the cryptographic key for the next asset in the workflow. This allows the asset handler to directly communicate, via encrypted communication, with the asset handler associated with the next asset in the workflow. At block 1122, the supervisor process activates execution of the asset service.

Numerous example variations and configurations will be apparent in light of this disclosure. According to some examples, computer-implemented methods to provision a computational workflow are described. An example computer-implemented method may include: receiving, by a security broker module, a request to provision a workflow, the workflow including an integration of a first asset and a second asset, wherein the first asset is owned by a first asset provider, and the second asset is owned by a second asset provider, the first and second asset providers associated with first and second IT infrastructures, respectively; launching, by a first supervisor, a first asset service for the first asset, the first asset service being launched in the first IT infrastructure, the first asset service comprising an asset application and a corresponding asset handler; launching, by a second supervisor, a second asset service for the second asset, the second asset service being launched in the second IT infrastructure, the second asset service comprising an asset application and a corresponding asset handler; executing, by the first supervisor, the launched first asset service; and executing, by the second supervisor, the launched second asset service; wherein the first asset service executes in the first IT infrastructure, and the second asset service executes in the second IT infrastructure, and wherein executing the launched first asset service and the launched second asset service comprises the asset handler of the first asset service directly communicating an output of its corresponding asset application to the asset handler of the second asset service.

In some examples, the asset application only communicates with its corresponding asset handler. In other examples, communication between the asset application and its corresponding asset handler is encrypted. In yet other examples, the direct communication between the asset handler of the first asset service and the asset handler of the second asset service is encrypted using a cryptographic key of the second asset service. In further examples, executing the launched second asset service comprises the asset handler of the second asset service communicating an output of its corresponding asset application to a workflow handler associated with the workflow. In still further examples, the communication between the asset handler of the second asset service and the workflow asset handler is encrypted using a cryptographic key of the workflow asset handler. In yet further examples, the method may also include monitoring the executing of the launched first asset service and the launched second asset service to check for adherence to a first terms of use specified for the first asset and adherence to a second terms of use specified for the second asset. In other examples, the terms of use include at least one of a call limit constraint a constraint on a number of concurrent runs, a start time of access, an end time of access, and valid IP addresses for communication.

According to some examples, computer program products including one or more non-transitory machine-readable mediums encoded with instructions that when executed by one or more processors cause a process to be carried out to provision a computational workflow are described. An example process may include: receiving, by a security broker module, a request to provision a workflow, the workflow including a first asset and a second asset, wherein the first asset is owned by a first asset provider, and the second asset is owned by a second asset provider, the first and second asset providers associated with first and second IT infrastructures, respectively; launching, by a first supervisor, a first asset service for the first asset in the first IT infrastructure, the first asset service comprising an asset application and a corresponding asset handler; launching, by a second supervisor, a second asset service for the second asset in the second IT infrastructure, the second asset service comprising an asset application and a corresponding asset handler; executing, by the first supervisor, the launched first asset service; and executing, by the second supervisor, the launched second asset service; wherein the first asset service executes in the first IT infrastructure, and the second asset service executes in the second IT infrastructure, and wherein executing the launched first asset service and the launched second asset service comprises the asset handler of the first asset service directly communicating an output of its corresponding asset application to the asset handler of the second asset service.

In some examples, the asset application only communicates with its corresponding asset handler. In other examples, the direct communication between the asset handler of the first asset service and the asset handler of the second asset service is encrypted using a cryptographic key of the second asset service. In still other examples, the cryptographic key is a public key. In yet other examples, executing the launched second asset service comprises the asset handler of the second asset service communicating an output of its corresponding asset application to a workflow handler associated with the workflow. In further examples, the process may also include monitoring the executing of the launched first asset service and the launched second asset service to check for adherence to a first terms of use specified for the first asset and adherence to a second terms of use specified for the second asset. In still further examples, the terms of use include at least one of a call limit constraint a constraint on a number of concurrent runs, a start time of access, an end time of access, and valid IP addresses for communication. In yet further examples, the process may also include terminating communication between the asset handler of the first asset service and the asset handler of the second asset service upon determining a violation of the specified first terms of use of the second terms of use.

According to some examples, systems to provision a computational workflow are described. An example system may include: one or more non-transitory machine-readable mediums configured to store instructions; and one or more processors configured to execute the instructions stored on the one or more non-transitory machine-readable mediums. Execution of the instructions by the one or more processors may cause the one or more processors to: receive, by a security broker module, a request to provision a workflow, the workflow including a first asset and a second asset, wherein the first asset is owned by a first asset provider, and the second asset is owned by a second asset provider, the first and second asset providers associated with first and second IT infrastructures, respectively; execute, by a first supervisor, a first asset service for the first asset in the first IT infrastructure, the first asset service comprising an asset application and a corresponding asset handler; and execute, by a second supervisor, a second asset service for the second asset in the second IT infrastructure, the second asset service comprising an asset application and a corresponding asset handler; wherein execution of the first asset service and the second asset service comprises the asset handler of the first asset service directly communicating an output of its corresponding asset application to the asset handler of the second asset service.

In some examples, the asset application only communicates with its corresponding asset handler. In other examples, execution of the launched second asset service comprises the asset handler of the second asset service communicating an output of its corresponding asset application to a workflow handler associated with the workflow. In still other examples, the direct communication between the asset handler of the first asset service and the asset handler of the second asset service is encrypted using a public key of the second asset service.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method to provision a computational workflow, the method comprising:
    receiving, by a security broker module, a request to provision a workflow, the workflow including an integration of a first asset and a second asset, wherein the first asset is owned by a first asset provider, and the second asset is owned by a second asset provider, the first and second asset providers associated with first and second IT infrastructures, respectively;
    launching, by a first supervisor, a first asset service for the first asset, the first asset service being launched in the first IT infrastructure, the first asset service comprising an asset application and a corresponding asset handler;
    launching, by a second supervisor, a second asset service for the second asset, the second asset service being launched in the second IT infrastructure, the second asset service comprising an asset application and a corresponding asset handler;
    executing, by the first supervisor the launched first asset service; and
    executing, by the second supervisor, the launched second asset service;
    wherein the first asset service executes in the first IT infrastructure, and the second asset service executes in the second IT infrastructure, and
    wherein executing the launched first asset service and the launched second asset service comprises the asset handler of the first asset service directly communicating an output of its corresponding asset application to the asset handler of the second asset service.

2. The method of claim 1, wherein the asset application only communicates with its corresponding asset handler.

3. The method of claim 2, wherein communication between the asset application and its corresponding asset handler is encrypted.

4. The method of claim 1, wherein the direct communication between the asset handler of the first asset service and the asset handler of the second asset service is encrypted using a cryptographic key of the second asset service.

5. The method of claim 1, wherein executing the launched second asset service comprises the asset handler of the second asset service communicating an output of its corresponding asset application to a workflow handler associated with the workflow.

6. The method of claim 5, wherein the communication between the asset handler of the second asset service and the workflow asset handler is encrypted using a cryptographic key of the workflow asset handler.

7. The method of claim 1, further comprising monitoring the executing of the launched first asset service and the launched second asset service to check for adherence to a first terms of use specified for the first asset and adherence to a second terms of use specified for the second asset.

8. The method of claim 7, wherein the terms of use include at least one of a call limit constraint a constraint on a number of concurrent runs, a start time of access, an end time of access, and valid IP addresses for communication.

9. A computer program product including one or more non-transitory machine-readable mediums encoded with instruction that when executed by one or more processors cause a process to be carried out to provision a computational workflow, the process comprising:
    receiving, by a security broker module, a request to provision a workflow, the workflow including a first asset and a second asset, wherein the first asset is owned by a first asset provider, and the second asset is owned by a second asset provider, the first and second asset providers associated with first and second IT infrastructures, respectively;
    launching, by a first supervisor, a first asset service for the first asset in the first IT infrastructure, the first asset service comprising an asset application and a corresponding asset handler;
    launching, by a second supervisor, a second asset service for the second asset in the second IT infrastructure, the second asset service comprising an asset application and a corresponding asset handler;

executing, by the first supervisor, the launched first asset service; and executing, by the second supervisor, the launched second asset service;

wherein the first asset service executes in the first IT infrastructure, and the second asset service executes in the second IT infrastructure, and wherein executing the launched first asset service and the launched second asset service comprises the asset handler of the first asset service directly communicating an output of its corresponding asset application to the asset handler of the second asset service.

10. The computer program product of claim 9, wherein the asset application only communicates with its corresponding asset handler.

11. The computer program product of claim 9, wherein the direct communication between the asset handler of the first asset service and the asset handler of the second asset service is encrypted using a cryptographic key of the second asset service.

12. The computer program product of claim 11, wherein the cryptographic key is a public key.

13. The computer program product of claim 9, wherein executing the launched second asset service comprises the asset handler of the second asset service communicating an output of its corresponding asset application to a workflow handler associated with the workflow.

14. The computer program product of claim 9, further comprising monitoring the executing of the launched first asset service and the launched second asset service to check for adherence to a first terms of use specified for the first asset and adherence to a second terms of use specified for the second asset.

15. The computer program product of claim 14, wherein the terms of use include at least one of a call limit constraint a constraint on a number of concurrent runs, a start time of access, an end time of access, and valid IP addresses for communication.

16. The computer program product of claim 14, further comprising terminating communication between the asset handler of the first asset service and the asset handler of the second asset service upon determining a violation of the specified first terms of use of the second terms of use.

17. A system to provision a computational workflow, the system comprising:
   one or more non-transitory machine-readable mediums configured to store instructions; and
   one or more processors configured to execute the instructions stored on the one or more non-transitory machine-readable mediums, wherein execution of the instructions causes the one or more processors to
      receive, by a security broker module, a request to provision a workflow, the workflow including a first asset and a second asset, wherein the first asset is owned by a first asset provider, and the second asset is owned by a second asset provider, the first and second asset providers associated with first and second IT infrastructures, respectively;
      execute, by a first supervisor, a first asset service for the first asset in the first IT infrastructure, the first asset service comprising an asset application and a corresponding asset handler; and
      execute, by a second supervisor, a second asset service for the second asset in the second IT infrastructure, the second asset service comprising an asset application and a corresponding asset handler;
      wherein execution of the first asset service and the second asset service comprises the asset handler of the first asset service directly communicating an output of its corresponding asset application to the asset handler of the second asset service.

18. The system of claim 17, wherein the asset application only communicates with its corresponding asset handler.

19. The system of claim 17, wherein execution of the launched second asset service comprises the asset handler of the second asset service communicating an output of its corresponding asset application to a workflow handler associated with the workflow.

20. The system of claim 17, wherein the direct communication between the asset handler of the first asset service and the asset handler of the second asset service is encrypted using a public key of the second asset service.

* * * * *